United States Patent
Westphal

(10) Patent No.: US 10,819,821 B2
(45) Date of Patent: Oct. 27, 2020

(54) METHOD AND SYSTEM FOR ALLOCATING CONTENT USING A CONTENT-BASED CENTRALITY METRIC

(71) Applicant: Futurewei Technologies, Inc., Plano, TX (US)

(72) Inventor: Cedric Westphal, San Francisco, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 141 days.

(21) Appl. No.: 15/821,892

(22) Filed: Nov. 24, 2017

(65) Prior Publication Data

US 2018/0295204 A1 Oct. 11, 2018

Related U.S. Application Data

(60) Provisional application No. 62/483,119, filed on Apr. 7, 2017.

(51) Int. Cl.
| | |
|---|---|
| G06F 15/16 | (2006.01) |
| H04L 29/08 | (2006.01) |
| G06F 12/0813 | (2016.01) |
| H04L 12/911 | (2013.01) |
| G06F 12/0862 | (2016.01) |
| H04L 12/721 | (2013.01) |
| H04L 12/927 | (2013.01) |
| H04L 12/733 | (2013.01) |

(52) U.S. Cl.
CPC ...... *H04L 67/2842* (2013.01); *G06F 12/0813* (2013.01); *G06F 12/0862* (2013.01); *H04L 45/122* (2013.01); *H04L 45/123* (2013.01); *H04L 45/124* (2013.01); *H04L 47/70* (2013.01); *H04L 47/781* (2013.01); *H04L 47/783* (2013.01); *H04L 47/80* (2013.01); *H04L 47/805* (2013.01); *H04L 47/822* (2013.01); *H04L 47/828* (2013.01); *H04L 67/10* (2013.01); *G06F 2212/6024* (2013.01); *G06F 2212/62* (2013.01)

(58) Field of Classification Search
CPC ........... G06F 12/0813; G06F 12/0862; G06F 2212/6024; G06F 2212/62; H04L 47/70; H04L 67/2842
See application file for complete search history.

(56) References Cited

U.S. PATENT DOCUMENTS

| | | | |
|---|---|---|---|
| 7,191,178 B1 * | 3/2007 | Phoha | H04L 67/1008 |
| 7,676,630 B2 * | 3/2010 | Qiao | G06F 16/172 |
| | | | 711/118 |

(Continued)

*Primary Examiner* — Yves Dalencourt
*Assistant Examiner* — Thorne E Waugh
(74) *Attorney, Agent, or Firm* — Vierra Magen Marcus LLP

(57) ABSTRACT

The present technology provides a new content-based centrality metric that may be used for allocating content to caches in a network. The proposed method for measuring centrality and allocating content not only considers the topology of the network, but also the distribution of cache spaces and content among the cache spaces in the network in order to improve how content may be allocated. This approach to content allocation enables improved content retrieval in the form of higher cache hit rates, lower delays and improved network performance.

18 Claims, 10 Drawing Sheets

(56) References Cited

U.S. PATENT DOCUMENTS

| | | | | |
|---|---|---|---|---|
| 7,730,086 B1* | 6/2010 | Phoha | | H04L 67/1023 |
| | | | | 707/776 |
| 7,730,216 B1* | 6/2010 | Issa | | H04L 67/104 |
| | | | | 709/250 |
| 9,009,192 B1* | 4/2015 | Shmiel | | G06F 16/9024 |
| | | | | 707/774 |
| 9,014,001 B2* | 4/2015 | Hong | | H04L 67/327 |
| | | | | 370/236 |
| 9,167,015 B2* | 10/2015 | Guo | | H04L 67/1097 |
| 9,379,995 B2* | 6/2016 | Shankari | | H04L 41/0896 |
| 9,558,233 B1* | 1/2017 | Kim | | G06F 16/951 |
| 9,680,915 B2* | 6/2017 | Pradhan | | H04L 67/20 |
| 10,078,811 B2* | 9/2018 | Skaaksrud | | H04W 4/025 |
| 2007/0079228 A1* | 4/2007 | Ando | | G11B 27/034 |
| | | | | 715/234 |
| 2009/0252046 A1* | 10/2009 | Canright | | H04L 41/22 |
| | | | | 370/250 |
| 2012/0311523 A1* | 12/2012 | Venkataraman | | G06F 8/71 |
| | | | | 717/104 |
| 2013/0163471 A1* | 6/2013 | Indukuri | | G06Q 10/00 |
| | | | | 370/255 |
| 2013/0198205 A1* | 8/2013 | Zaman | | G06F 16/9535 |
| | | | | 707/748 |
| 2014/0207912 A1* | 7/2014 | Thibeault | | H04L 67/2847 |
| | | | | 709/219 |
| 2014/0317223 A1* | 10/2014 | Park | | H04L 67/2842 |
| | | | | 709/213 |
| 2015/0023206 A1* | 1/2015 | Le Merrer | | H04L 41/12 |
| | | | | 370/254 |
| 2015/0067043 A1* | 3/2015 | Agarwal | | H04L 67/306 |
| | | | | 709/204 |
| 2016/0117355 A1* | 4/2016 | Krishnamurthy | | G06F 16/23 |
| | | | | 707/749 |
| 2017/0026441 A1* | 1/2017 | Moudy | | G06F 9/5027 |
| 2018/0242381 A1* | 8/2018 | Wei | | H04W 40/22 |
| 2019/0149422 A1* | 5/2019 | Narayanam | | H04L 41/12 |
| | | | | 370/254 |

* cited by examiner

METHOD AND SYSTEM FOR ALLOCATING CONTENT USING A CONTENT-BASED CENTRALITY METRIC

CLAIM OF PRIORITY

The present application claims priority to U.S. Provisional Patent Application No. 62/483,119, entitled "Method And System For Allocating Content Using A Content-Based Centrality Metric," filed Apr. 7, 2017, which application is incorporated by reference herein in its entirety.

BACKGROUND

Information-Centric Fog Networking is an approach to information networks that allows network nodes and devices near the end-user to perform caching, storage, communication, and computation, rather than performing those functions in the cloud. The goal of this approach is to offload the content and some of its processing closer to end-users in order to reduce cost, bandwidth consumption and network overhead. The nodes around the end-user form a network from which the end-user can retrieve content stored in those network nodes. In a fog network, network nodes connect with each other directly to get content locally whenever possible.

Because the topology of the network influences the network nodes' connectivity and how information travels across the network, there has been efforts to compute the graph centrality of each network node. Centrality is a concept from graph theory that typically applies to social networks to find important nodes in a graph. A high centrality score reflects a high topological connectivity for a node in the network. Typical centrality measures are: degree (the number of directly connected nodes), closeness (the average length of the shortest paths between the node and all other nodes in the graph); betweenness (the number of shortest paths between all pairs of nodes in the graph going through a specific node), and eigenvector centrality (a measure of node influence in the network). Because a fog network is not as structured and organized as a managed operator network, the graph centrality of network nodes derived from the topology of the network can be helpful in identifying and understanding the structure of fog networks. Centrality can further be used to distinguish the nodes in the network, or to prioritize some nodes over others, such as when choosing which node to store or retrieve data.

Traditional graph centrality measures only consider the topology of nodes and their connections to each other, but does not take into account the caching capacity of nodes or how content is allocated at node caches. Therefore, although traditional graph centrality measures highlight nodes that have the highest topological connectivity to other nodes, they do not identify nodes that are most connected to the content that users may be interested in accessing. Traditional graph centrality therefore may not be the most optimal metric for understanding how information is structured in an information-centric fog network.

SUMMARY

According to one aspect of the present disclosure, there is provided a network content allocation device that includes: a non-transitory memory storage comprising instructions; and one or more processors in communication with the memory, wherein the one or more processors execute the instructions to: determine a content-based centrality score for each of the plurality of nodes, the content based centrality score for a node determined by computing a centrality of the node based on a location of the node relative to locations of the one or more user devices and relative to the content items in the network, and allocate content items to the plurality of nodes based on a comparison of content-based centrality scores among nodes in the network.

Optionally, in the preceding aspect, determining the content-based centrality score for a node i comprises determining a sum of a ratio of a number of shortest paths from the one or more user devices to the content items that pass through the node i, to a total number of shortest paths from the one or more user devices to the content items.

Optionally, in any of the preceding aspects, determining a content-based centrality score for each cache in the network is based on the network topology of the network system as well as the allocation of content items among caches in the network system.

Optionally, in any of the preceding aspects, determining a content-based centrality score for each cache in the network further comprises computing the sum of the ratio of the number of shortest paths from all users to all content that passes through the cache to the total number of shortest paths between all user-content pairs.

Optionally, in any of the preceding aspects, the one or more processors further execute instructions to determine a popularity score for each of the plurality of content items.

Optionally, in any of the preceding aspects, determining a popularity score for each content item is based on a predetermined value associated with each content item.

Optionally, in any of the preceding aspects, determining a popularity score for each content item is based on the number of user requests for each content item according to historical data.

Optionally, in any of the preceding aspects, determining a popularity score for each content item comprises requesting the popularity scores associated with each content item from a content operator.

Optionally, in any of the preceding aspects, content items are stored in memory of the plurality of nodes based on the popularity score of the plurality of nodes and the content-based centrality of the nodes.

Optionally, in any of the preceding aspects, the memory of the plurality of nodes comprises a common cache space storing content items that are stored in each of the plurality of nodes, and a specific cache space storing content items that are stored in less than each of the plurality of nodes.

Optionally, in any of the preceding aspects, the one or more processors further execute instructions to: store a copy of each of the content items, in decreasing order of popularity score, in the common cache space of each node in the network until the common cache space of node in the network becomes full or until all content items have been placed; select the specific cache space of the node having the highest content-based centrality score in response to the common cache of each node being full; store each of the remaining content items, in decreasing order of popularity score, in the selected specific cache space until the selected specific cache space becomes full or until all content items have been placed; and select the specific cache space of the cache having the next highest content-based centrality score in response to the selected specific cache space being full.

Optionally, in any of the preceding aspects, the common cache space of each of the plurality of nodes has the same size and contain copies of the same content items According to another aspect of the present disclosure, there is provided a computer-implemented method for allocating one or more content items among one or more caches in a network system that includes: determining a content-based centrality score for each of the plurality of nodes, the content based centrality score for a node determined by computing a centrality of the node based on a location of the node relative to locations of the one or more user devices and relative to the content items in the network, and allocating content items to the plurality of nodes based on a comparison of content-based centrality scores among nodes in the network.

Optionally, in any of the preceding aspects, determining the content-based centrality score for a node i comprises determining a sum of a ratio of a number of shortest paths from the one or more user devices to the content items that pass through the node i, to a total number of shortest paths from the one or more user devices to the content items.

Optionally, in any of the preceding aspects, further determining a popularity score for each of the plurality of content items.

Optionally, in any of the preceding aspects, determining a popularity score for each content item is based on a predetermined value associated with each content item Optionally, in any of the preceding aspects, determining a popularity score for each content item is based on a predetermined value associated with each content item.

Optionally, in any of the preceding aspects, determining a popularity score for each content item is based on the number of user requests for each content item according to historical data.

Optionally, in any of the preceding aspects, further storing the content items in memory of the plurality of nodes based on the popularity score of the plurality of nodes and the content-based centrality of the nodes.

Optionally, in any of the preceding aspects, the memory of the plurality of nodes comprises a common cache space storing content items that are stored in each of the plurality of nodes, and a specific cache space storing content items that are stored in less than each of the plurality of nodes.

Optionally, in any of the preceding aspects, further comprising the steps of: storing a copy of each of the content items, in decreasing order of popularity score, in the common cache space of each node in the network until the common cache space of node in the network becomes full or until all content items have been placed; selecting the specific cache space of the node having the highest content-based centrality score in response to the common cache of each node being full; storing each of the remaining content items, in decreasing order of popularity score, in the selected specific cache space until the selected specific cache space becomes full or until all content items have been placed; and selecting the specific cache space of the cache having the next highest content-based centrality score in response to the selected specific cache space being full.

According to another aspect of the present disclosure, there is provided a non-transitory computer-readable medium storing computer instructions for allocating one or more content items among one or more caches in a network system, that when executed by one or more processors, cause the one or more processors to perform the steps of: determining a content-based centrality score for each of the plurality of nodes, wherein determining the content-based centrality score for a node i comprises determining a sum of a ratio of a number of shortest paths from the one or more user devices to the content items that pass through the node i, to a total number of shortest paths from the one or more user devices to the content items, and allocating content items to the plurality of nodes based on a comparison of content-based centrality scores among nodes in the network.

Optionally, in any of the preceding aspects, further determining a popularity score for each of the plurality of content items.

Optionally, in any of the preceding aspects, wherein determining a popularity score for each content item is based on a predetermined value associated with each content item.

Optionally, in any of the preceding aspects, wherein determining a popularity score for each content item is based on the number of user requests for each content item according to historical data.

Optionally, in any of the preceding aspects, further storing the content items in memory of the plurality of nodes based on the popularity score of the plurality of nodes and the content-based centrality of the nodes.

Optionally, in any of the preceding aspects, wherein the memory of the plurality of nodes comprises a common cache space storing content items that are stored in each of the plurality of nodes, and a specific cache space storing content items that are stored in less than each of the plurality of nodes.

Optionally, in any of the preceding aspects, further comprising the steps of: storing a copy of each of the content items, in decreasing order of popularity score, in the common cache space of each node in the network until the common cache space of node in the network becomes full or until all content items have been placed; selecting the specific cache space of the node having the highest content-based centrality score in response to the common cache of each node being full; storing each of the remaining content items, in decreasing order of popularity score, in the selected specific cache space until the selected specific cache space becomes full or until all content items have been placed; and selecting the specific cache space of the cache having the next highest content-based centrality score in response to the selected specific cache space being full.

According to another aspect of the present disclosure, there is provided a non-transitory memory storage comprising instructions; and one or more processors in communication with the memory, wherein the one or more processors execute the instructions to: determine a popularity-weighted, content-based centrality score for each of the plurality of nodes, the content based centrality score for a node determined by computing a weighted popularity of content items in the node, and a centrality of the node based on a location of the node relative to locations of the one or more user devices and relative to the content items in the network, and allocate content items to the plurality of nodes based on a comparison of popularity-weighted, content-based centrality scores among nodes in the network.

Optionally, in any of the preceding aspects, wherein a first content item arriving at the node replaces a second content items stored in cache at the node where it is determined that the node including the first content item and not the second content item has a higher popularity-weighted, content-based centrality score than the node including the second content item and not the first content item.

Optionally, in any of the preceding aspects, wherein determining the popularity-weighted, content-based centrality scores for a node i comprises determining a sum of a ratio of a number of shortest paths from the one or more user devices to the content items that pass through the node i, to a total number of shortest paths from the one or more user devices to the content items.

Optionally, in any of the preceding aspects, wherein portions of the popularity-weighted, content-based centrality score for the node are pre-computed and stored in cache at the node.

DETAILED DESCRIPTION

The present technology, roughly described, relates to a content-based centrality metric that may be used for allocating content to caches in a network. The content-based centrality metric is based on the insight that a network node that has relatively fewer connections to other nodes, but is able to store a lot of content in its cache, may nevertheless provide a very valuable role in the network. In accordance with aspects of the present technology, a network node found to have a high content-based centrality measure may be prioritized over another network node that may have more connections to other nodes, but less content stored in its cache.

Thus, the proposed method for measuring centrality and allocating content not only considers the topology of the network, but also the distribution of cache spaces and content among the cache spaces in the network in order to improve how content may be allocated. Nodes found to have the highest measure of content-based centrality may be selected or identified for the allocation of content items. This approach to content allocation enables improved content retrieval in the form of higher cache hit rates, lower delays and improved network performance.

Figure 1:
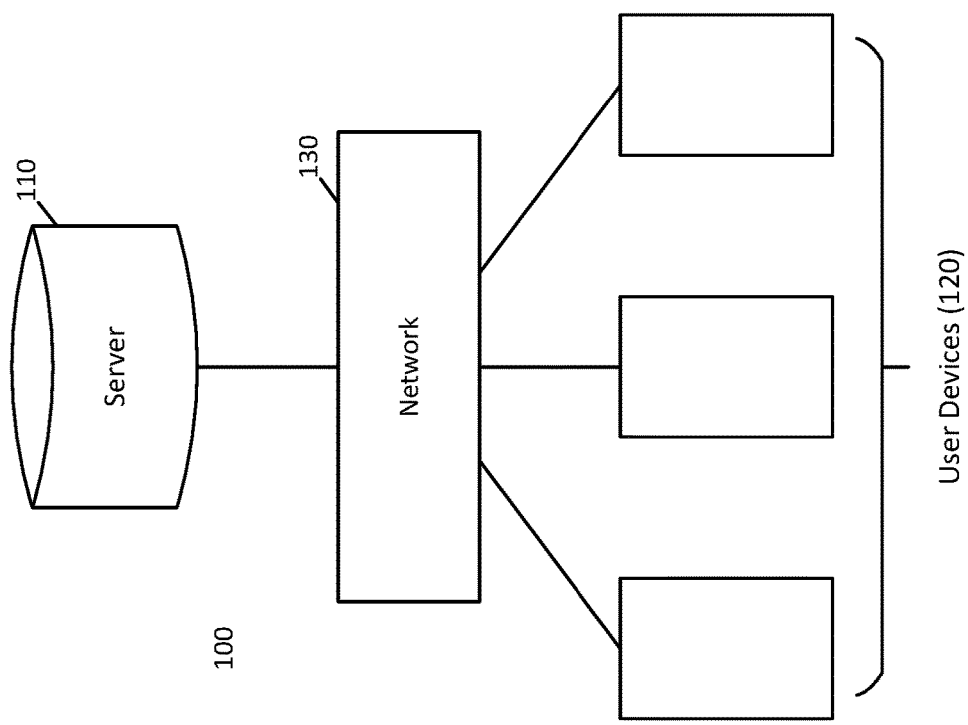
FIG. 1 is a high-level drawing of a fog network in which embodiments of the present technology may be implemented.

FIG. 1 illustrates an embodiment and an exemplary model of a network system 100 comprising a central server 110 that is connected to one or more user devices 120 via a network 130. The user devices 120 may be any one device or combination of devices having the ability to connect to a network, such as desktop computers, laptop computers, tablet computers, cellular phones, smart phones, portable media players, televisions, etc. The network 130 may use any one communication standard or a combination of communication standards, such as CDMA, GSM, 3G, 4G, WiMAX, etc.

Figure 2:
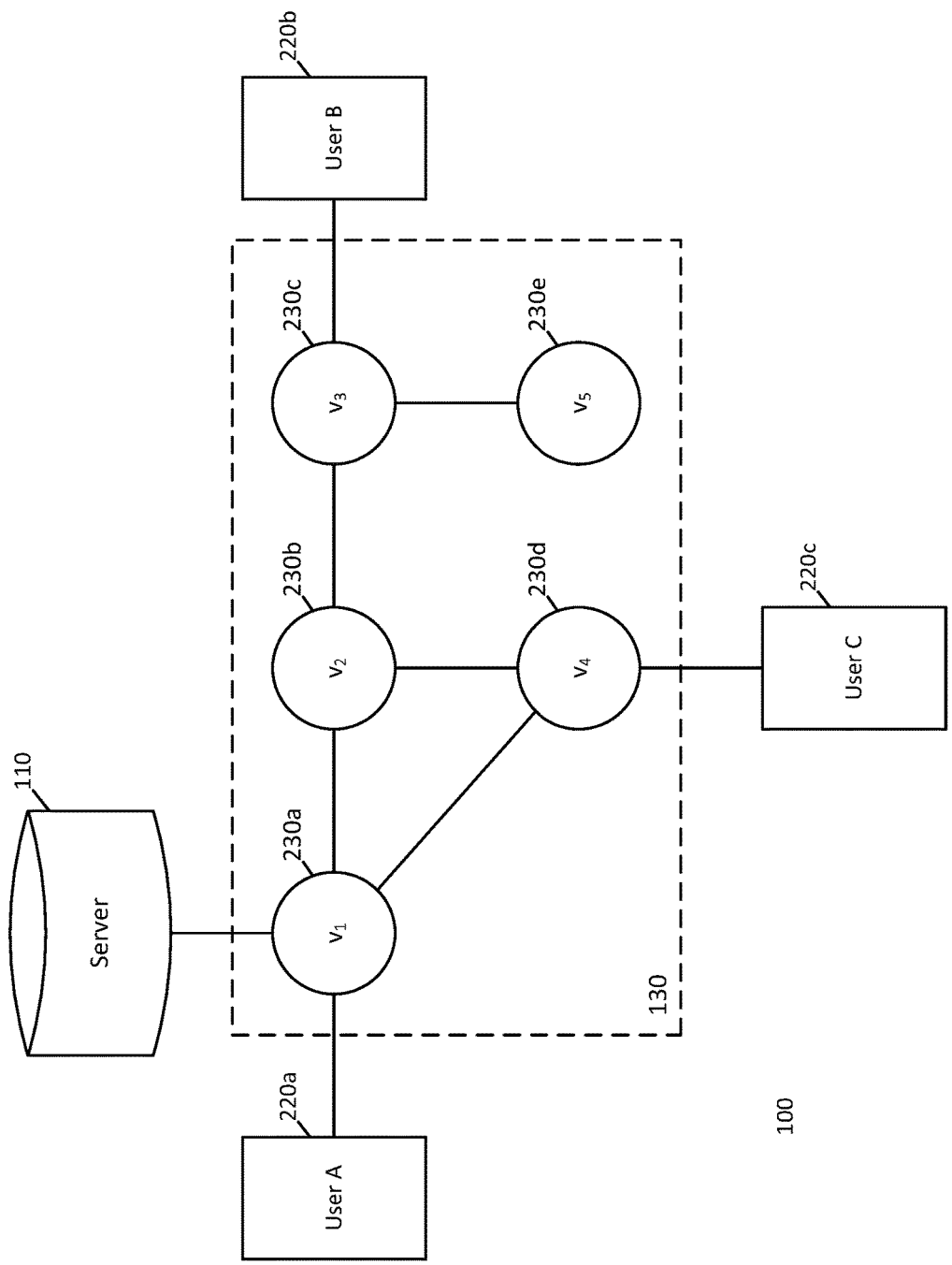
FIG. 2 illustrates a first exemplary fog network having 5 network nodes in addition to a server and the three devices that are connected to the network nodes.

FIG. 2 expands on the model of the network system 100 in FIG. 1 and provides an embodiment of the network system 100 where the network 130 includes five network nodes 230a to 230e. The network nodes 230 are labeled $v_1$ to $v_5$ to distinguish between individual nodes. It is understood that the number of network nodes may be different in other embodiments. In this embodiment, there are three user devices 220a to 220c, labelled user A, B, and C, that are connected to the network 130. It is understood that other embodiments may include greater or fewer user devices 120 in the network system 100. In one embodiment, every connection between two nodes, a node and a user, or a node and the server are of the same distance, or have the same weight. In other embodiments, the connections between different nodes, users, and servers in the network system may have different distances or weights. In one embodiment the nodes 230 may represent geographic locations. In another embodiment, the nodes 230 may represent virtual network hubs.

Figure 3:
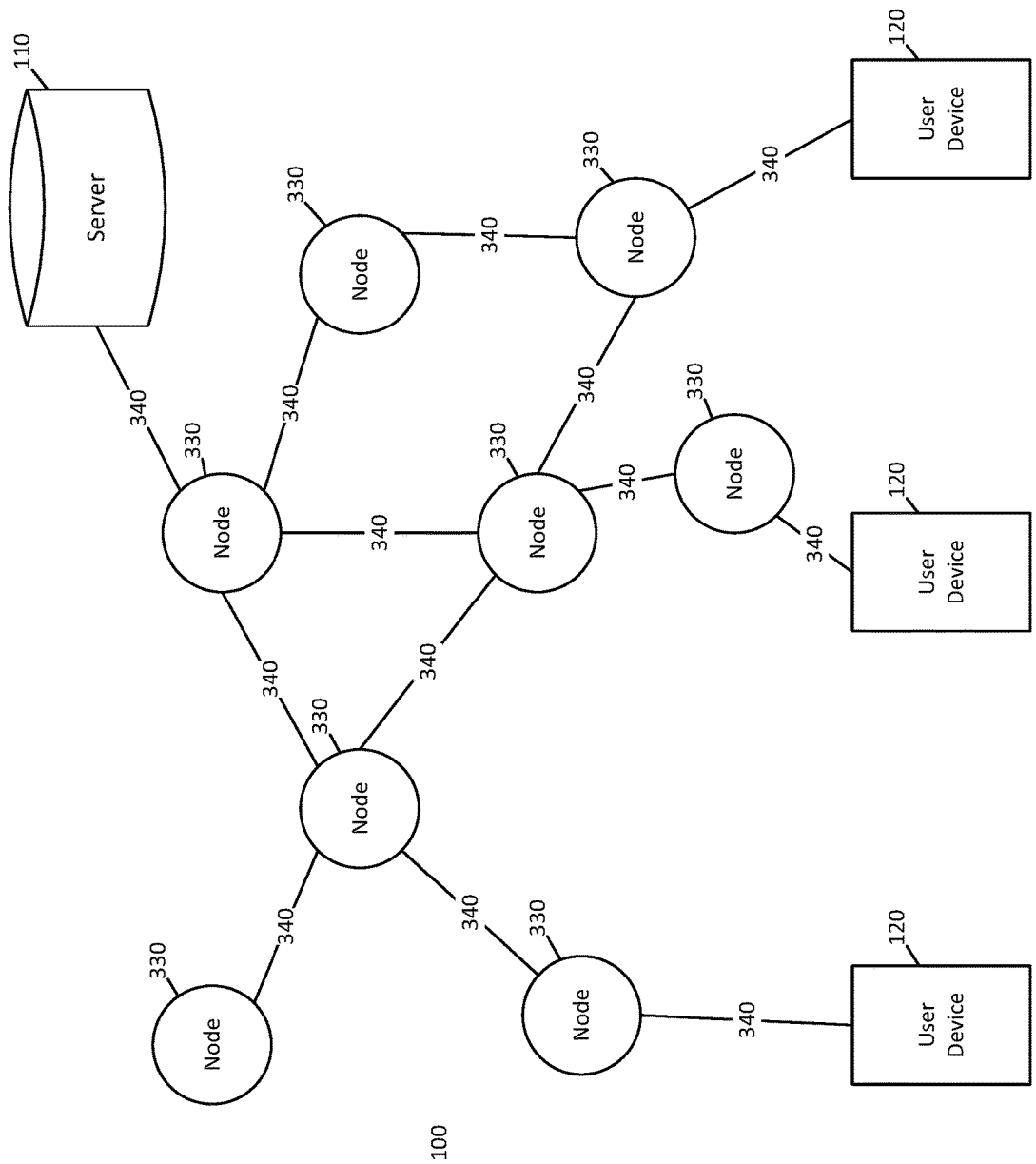
FIG. 3 illustrates a second exemplary fog network having 8 network nodes in addition to a server and three devices that are connected to the network nodes.

FIG. 3 similarly expands on the model of the network system 100 in FIG. 1 and provides another embodiment of the network system 100 where the network 130 from FIG. 1 includes a network of eight nodes 330 that are connected to the central server 110, to the user devices 120, and to each other via network connections 340. It is understood that the number of network nodes may be different in other embodiments. In this embodiment, there are three user devices 120, although it is understood that the number of user devices may be different in other embodiments. In one embodiment, the nodes 230 represent geographic locations. In another embodiment, the nodes 230 represent virtual network hubs. The network connections 340 in this embodiment have the same distance or weight, although it is understood that the distance or weight of network connections may be different in other embodiments.

Figure 4:
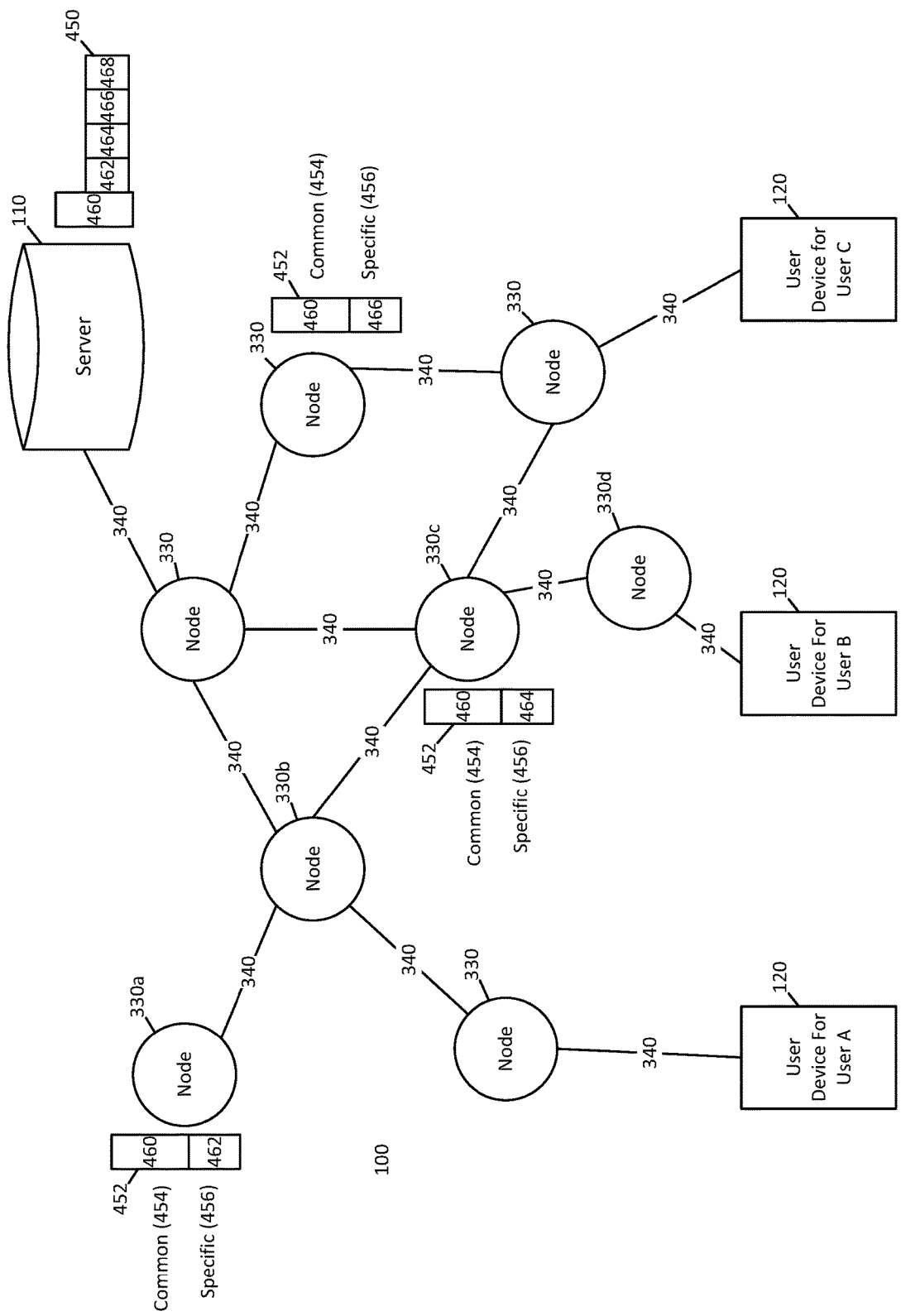
FIG. 4 illustrates the exemplary fog network from FIG. 3 wherein some of the network nodes have caches.

FIG. 4 expands on FIG. 3 and provides an embodiment of the network system 100 where the server 110 has a server memory 450 for storing content, and some of the network nodes 330 have a cache 452 for storing content locally at the network node 330. The server memory 450 stores a copy of every digital content item available on the network system 100. These content items are represented as content blocks 460 to 468 each containing one or more content items. Content block 460 contains content items that can be found in the server memory 450 and in every cache 452 in the network system 100. On the other hand, content blocks 462 to 468 contain content items that can be found on the server memory 450, but cannot be found in every cache 452 in the network system 100. For example, content block 462 contains content items found on the server 110 and cache 452 of one node (node 330a, upper left in FIG. 4) but not the other nodes. Each cache 330 stores a copy of some of the content items in the network system 100. In one embodiment, all caches 452 have the same amount of memory, but the size of the caches 452 may be different in further embodiments.

Each cache 452 may be partitioned into two sections: a common cache space 454 that stores content items that can be found in every cache 452, and a specific cache space 456 that stores content items that cannot be found in any other cache 452 in the network system 100 and can only be found in that specific cache space 456 and at the server memory 450. In one embodiment, the size of every common cache space 454 is the same such that each common cache space 452 has the same amount of memory and can store the same number of content items as all the other common cache spaces 454. In other embodiments, the size of the common cache spaces may differ between different caches. In one embodiment the size of each common cache space 454 is a fixed amount of memory such that the remaining amount of memory in each cache 452 is the specific cache space 456. It is understood that other methods of partitioning a cache 452, such as a percentage-based partition, are possible in other embodiments.

The centrality of a node in a network is, in a general sense, how connected that node is to other elements in the network. Traditional centrality metrics, such as degree, closeness, betweenness, and eigenvector centrality, are topology-based in that they measure how central a node is relative to other nodes in a network. The present technology proposes a new centrality metric called content-based centrality that redefines traditional centrality metrics to measure how central a node is relative to users and content in a network.

In one embodiment, the definition of content-based centrality is based on the definition of betweenness centrality. It is understood that other forms of centrality can be used as well, such as closeness or eccentricity, in other embodiments. The betweenness centrality for a given node measures how many shortest paths between two other nodes in the network pass through the given node. In one embodiment, the shortest path between two nodes is the path that passes through the fewest number of nodes. For example, with reference to FIG. 2, the shortest path between User C and the Server consists of nodes: User C, $v_4$, $v_1$, and the Server. Adding node $v_2$ would create a longer path since it would increase the length of the path by one additional node. In FIG. 4, there is one shortest path between node 330a and the user device 120 for User B. That shortest path is from node 330, through nodes 330b, 330c and 330d, and then to user device 120 for User B. The betweenness centrality of a node in a network can be mathematically defined as the sum of the ratio of: the number of shortest paths between all combinations of two other nodes in the network that pass through the node being measured, to the total number of shortest paths between all combinations of two other nodes in the network. Mathematically, the betweenness centrality of a node v can be represented as:

$$g(v) = \sum_{s \neq v \neq t} \frac{\sigma_{st}(v)}{\sigma_{st}}$$

where s, v, and t are distinct nodes such that $\sigma_{st}(v)$ is the number of shortest paths from a starting node s to a destination node t that passes through the node v, and $\sigma_{st}$ is the total number of shortest paths from the node s to the node t. For example, where s is node $v_1$, t is $v_5$, and v is $v_2$, the shortest path between nodes $v_1$ and $v_5$ is: $v_1, v_2, v_3, v_5$. Since this is the only shortest path between nodes $v_1$ and $v_5$, $\sigma_{st}$ is 1. Since that path passes through node $v_2$, $\sigma_{st}(v)$ is also 1. The complete determination of betweenness centrality of nodes $v_1$ and $v_2$ in FIG. 2 can be computed as follows:

| | $g(v_1)$ | | |
|---|---|---|---|
| node pair (s, t) | $\sigma_{st}$ | $\sigma_{st}(v_1)$ | ratio |
| (server, user A) | 1 | 1 | 1 |
| (server, user B) | 1 | 1 | 1 |
| (server, user C) | 1 | 1 | 1 |
| (server, $v_2$) | 1 | 1 | 1 |
| (server, $v_3$) | 1 | 1 | 1 |
| (server, $v_4$) | 1 | 1 | 1 |
| (server, $v_5$) | 1 | 1 | 1 |
| (user A, user B) | 1 | 1 | 1 |
| (user A, user C) | 1 | 1 | 1 |
| (user A, $v_2$) | 1 | 1 | 1 |
| (user A, $v_3$) | 1 | 1 | 1 |
| (user A, $v_4$) | 1 | 1 | 1 |
| (user A, $v_5$) | 1 | 1 | 1 |
| (user B, user C) | 1 | 0 | 0 |
| (user B, $v_2$) | 1 | 0 | 0 |
| (user B, $v_3$) | 1 | 0 | 0 |
| (user B, $v_4$) | 1 | 0 | 0 |
| (user B, $v_5$) | 1 | 0 | 0 |
| (user C, $v_2$) | 1 | 0 | 0 |
| (user C, $v_3$) | 1 | 0 | 0 |
| (user C, $v_4$) | 1 | 0 | 0 |
| (user C, $v_5$) | 1 | 0 | 0 |
| ($v_2, v_3$) | 1 | 0 | 0 |
| ($v_2, v_4$) | 1 | 0 | 0 |
| ($v_2, v_5$) | 1 | 0 | 0 |
| ($v_3, v_4$) | 1 | 0 | 0 |
| ($v_3, v_5$) | 1 | 0 | 0 |
| ($v_4, v_5$) | 1 | 0 | 0 |
| total | | | 13 |

| | $g(v_2)$ | | |
|---|---|---|---|
| node pair (s, t) | $\sigma_{st}$ | $\sigma_{st}(v_2)$ | ratio |
| (server, user A) | 1 | 0 | 0 |
| (server, user B) | 1 | 1 | 1 |
| (server, user C) | 1 | 0 | 0 |
| (server, $v_1$) | 1 | 0 | 0 |
| (server, $v_3$) | 1 | 1 | 1 |
| (server, $v_4$) | 1 | 0 | 0 |
| (server, $v_5$) | 1 | 1 | 1 |
| (user A, user B) | 1 | 1 | 1 |
| (user A, user C) | 1 | 0 | 0 |
| (user A, $v_1$) | 1 | 0 | 0 |
| (user A, $v_3$) | 1 | 1 | 1 |
| (user A, $v_4$) | 1 | 0 | 0 |
| (user A, $v_5$) | 1 | 1 | 1 |
| (user B, user C) | 1 | 1 | 1 |
| (user B, $v_1$) | 1 | 1 | 1 |
| (user B, $v_3$) | 1 | 0 | 0 |
| (user B, $v_4$) | 1 | 1 | 1 |
| (user B, $v_5$) | 1 | 0 | 0 |
| (user C, $v_1$) | 1 | 0 | 0 |
| (user C, $v_3$) | 1 | 1 | 1 |
| (user C, $v_4$) | 1 | 0 | 0 |
| (user C, $v_5$) | 1 | 1 | 1 |
| ($v_1, v_3$) | 1 | 1 | 1 |
| ($v_1, v_4$) | 1 | 0 | 0 |
| ($v_1, v_5$) | 1 | 1 | 1 |
| ($v_3, v_4$) | 1 | 1 | 1 |
| ($v_3, v_5$) | 1 | 0 | 0 |
| ($v_4, v_5$) | 1 | 1 | 1 |
| total | | | 15 |

As seen from the calculations above, using traditional betweenness centrality, node $v_2$, with a betweenness centrality score of 15, is a more central node than $v_1$, which has a betweenness centrality score of 13.

In one embodiment, the content-based centrality for a given node may be defined to measure how many shortest paths between a user and a content item pass through the given node. For example, with reference to FIG. 2 where all the content is stored on the Server, there are only three shortest paths between a user and a content item in the network 100. Specifically, the three shortest paths are: (1) User A, $v_1$, Server, (2) User B, $v_3$, $v_2$, $v_1$, Server, and (3) User C, $v_4$, $v_1$, Server. The content centrality of a given node 230 in the network 100 would therefore count how many of these three paths pass through the given node 230. More formally, content-based centrality may be defined as the sum of the ratio of: the number of shortest paths from all users to all content that passes through the node, to the total number of shortest paths from the users to the content. Mathematically, the content-based centrality of a node v can be represented as:

$$cbc(v) = \sum_{u \neq v \neq x} \frac{\sigma_{ux}(v)}{\sigma_{ux}}$$

where $\sigma_{ux}(v)$ is the number of shortest paths from a user node u to content x that passes through the node v, and $\sigma_{ux}$ is the total number of shortest paths from user node u to the content x. For example, as previously mentioned, the three shortest paths from a user to a content item are: (1) User A, $v_1$, Server, (2) User B, $v_3$, $v_2$, $v_1$, Server, and (3) User C, $v_4$, $v_1$, Server. Thus, the sum of $\sigma_{ux}$ for all user-content pairs is 3. And for a given node where v is $v_1$, because all three of these paths pass through node $v_1$, the sum of $\sigma_{ux}(v)$ for all user-content pairs passing through node v1 is also 3. As a result, the cbc(v) for node $v_1$ is 3/3=1. The complete determination of content-based centrality for the nodes $v_1$ and $v_2$ can be computed as follows:

| | cbc($v_1$) | | |
| --- | --- | --- | --- |
| node pair (u, x) | $\sigma_{ux}$ | $\sigma_{ux}(v_1)$ | ratio |
| (user A, server) | 1 | 1 | 1 |
| (user B, server) | 1 | 1 | 1 |
| (user C, server) | 1 | 1 | 1 |
| total | | | 3 |

| | cbc($v_2$) | | |
| --- | --- | --- | --- |
| node pair (u, x) | $\sigma_{ux}$ | $\sigma_{ux}(v_2)$ | ratio |
| (user A, server) | 1 | 0 | 0 |
| (user B, server) | 1 | 1 | 1 |
| (user C, server) | 1 | 0 | 0 |
| total | | | 1 |

As seen from the calculations above, only the user-content node pairs involving a user and the server are considered since all the content items x in this network system are stored on the server. In contrast to traditional betweenness centrality, using content-based centrality, node $v_1$, having a content-based centrality score of 3, is a more central node than $v_2$, which has a content-based centrality score of 1.

Note that the content-based centrality score scales with the number of user-content pairs as implied by the summation indices. The calculation of content-based centrality can therefore be normalized so that the resulting content-based centrality score is a value between 0 and 1. The content-based centrality of a node v in the network can be normalized as follows:

$$\text{normal}(cbc(v)) = \frac{cbc(v) - \min_{w \in V}(cbc(w))}{\max_{w \in V}(cbc(w)) - \min_{w \in V}(cbc(w))} \quad \text{(Eq. 1)}$$

where $\min_{w \in V}(cbc(w))$ is the lowest content-based centrality score for any node in the network and $\max_{w \in V}(cbc(w))$ is the highest content-based centrality score for any node in the network.

Figure 5:
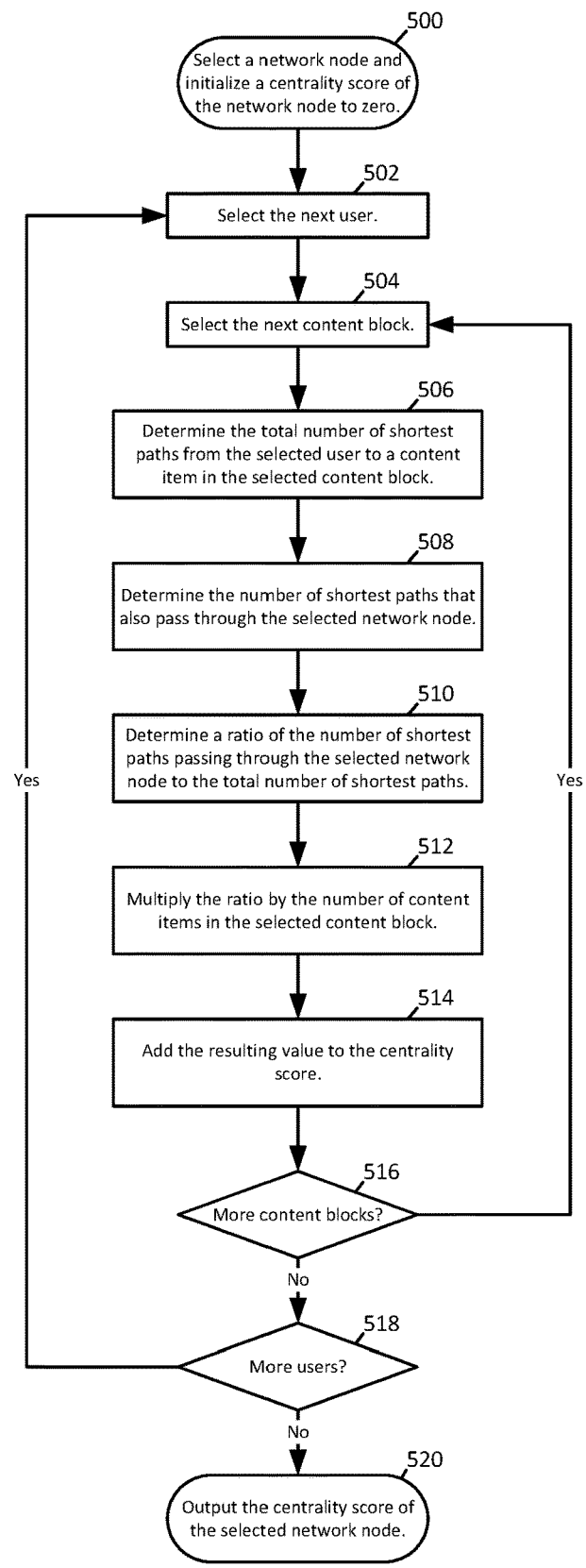
FIG. 5 is a flowchart illustrating an embodiment of the present technology wherein a centrality score is calculated for a network node.

FIG. 5 illustrates an exemplary method for calculating the content-based centrality score of a network node in a network system having a server, one or more network nodes, one or more users, one or more caches for storing content items associates with the one or more network nodes, and one or more content items stored as part of one or more content blocks stored on the server and/or the one or more caches.

At step 500, a network node is selected for computing the content-based centrality of the network node and a centrality score for the network node is initialized to zero. At step 502, a next user is selected. A user that has previously been selected may not be selected again. For example, using multiple iterations through the method of FIG. 5, the content-based centrality of each node may be determined with respect to all of the users.

At step 504, a content block is selected. For each selected user, a content block that has previously been selected may not be selected again. Once a content block is selected, the system may seek to find one or more shortest paths from a selected user to the selected content block regardless of where the content block may be located in the network. For example, with reference to FIG. 6, for content block 462, it is stored both at the server 110 and in the cache 652a at node 630a. Accordingly, the system would seek to find the shortest path from a selected user, such as User A 620a, to the selected content block 462, which could yield one or more paths from User A 620a to either cache 652a or the Server 110 or both depending on which of the computed paths is shortest. In this way, the method is agnostic to the location of each selected content block in the network and would generate one or more shortest paths from a selected user to a selected content block regardless of where the content block is located or whether the content block may be found in a single location or multiple locations. In an alternative embodiment, calculating the content-based centrality score for a network node may involve selecting each individual content item for each selected user, rather than selecting blocks of content item as was just discussed.

In this embodiment, each cache in the network is partitioned into a common cache space and a specific cache space. The common cache space stores content items that are found in all caches, while the specific cache space stores content items unique to the particular cache associated with the specific cache space. In alternative embodiments, other assumptions about content caches, cache partitioning and about the network system 100 can be implemented into the approach for calculating content-based centrality. For example, in one embodiment, caches that are within a certain distance of each other have no content overlap. In another embodiment, content requests from one user requests different content items relative to content requests from another user with a certain percentage of overlap that is determined based on historical data. In another embodiment, the model assumes that certain pair-wise cache decisions ensure that any content item will be placed in only two out of every three caches. It is understood that other similar assumptions about content allocation can be embedded into the model for calculating content-based centrality.

At step 506, the total number of shortest paths from the selected user to the selected content block is determined. At step 508, the number of shortest paths between the selected user to the selected content block passing through the selected network node is determined. At step 510, a ratio is determined by dividing the result from step 508 by the result from step 506. At step 512, the ratio from step 510 is multiplied by the number of content items in the selected content block. At step 514 the resulting value from step 510 is added to the centrality score.

At step 516, a check is performed to determine whether there are any more content blocks that have yet to be selected to pair with the currently selected user. If there are more unselected content blocks, the process loops back to step 504, where a next content block is selected. Otherwise, the process continues to step 518.

At step 518, a second check is performed to determine whether there are any more users that have yet to be selected. If there are more unselected users, the process loops back to step 502, where a next user is selected. Otherwise, the process continues to step 520, where the centrality score of the selected network node is produced and outputted.

Figure 6:
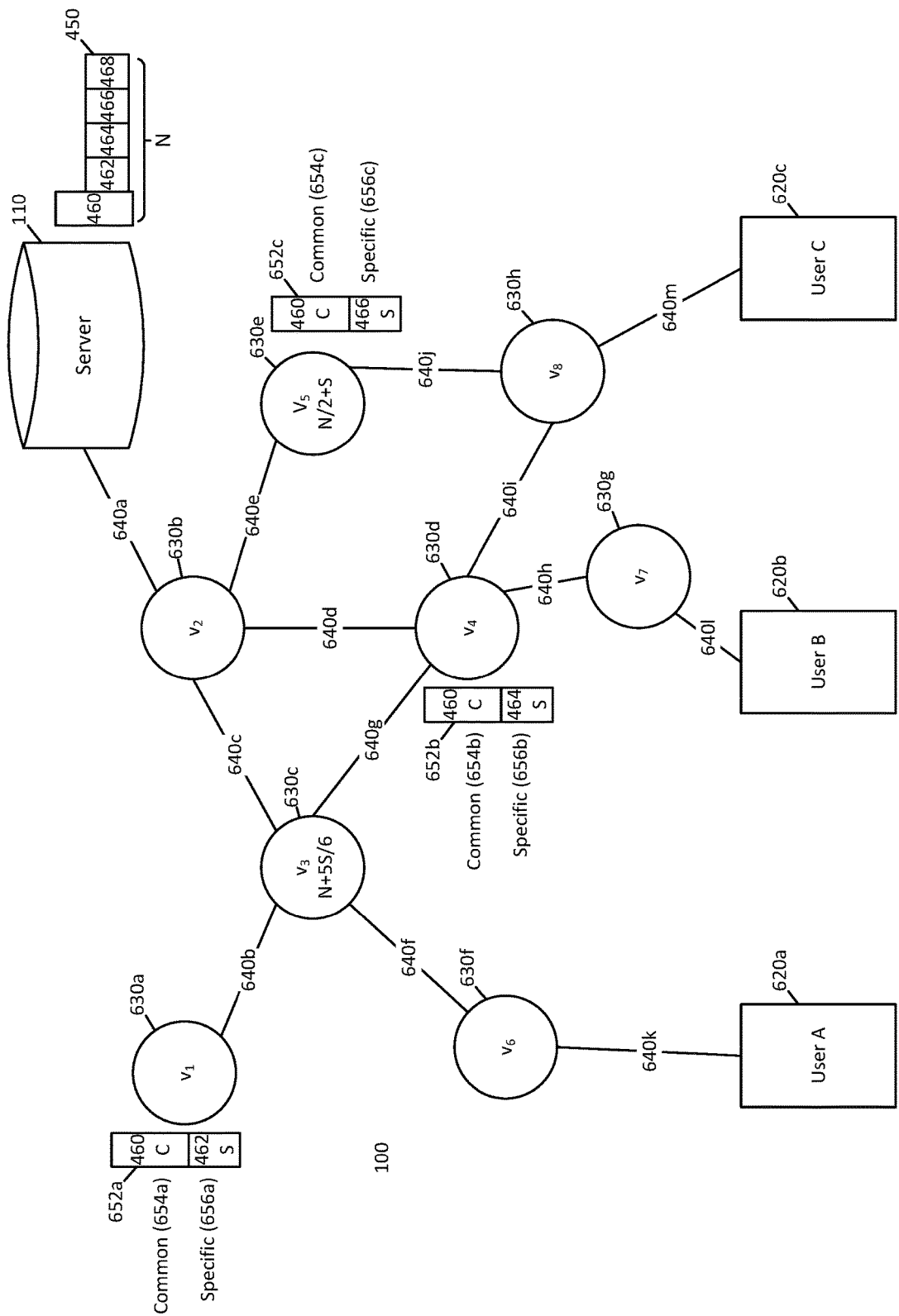
FIG. 6 illustrates the exemplary fog network from FIG. 4 wherein centrality scores for various network nodes are provided.

FIG. 6 expands on FIG. 4 and provides an embodiment of the network system 100 and shows the resulting content-based centrality scores for some of the network nodes 230 of the network system 100. This figure is provided to demonstrate an example of how the content-based centrality of a network node 630 may be calculated. Network nodes 630a to 630h are labeled as $v_1$ to $v_8$, respectively, to distinguish between individual network nodes 630 and for ease of reference. In this embodiment, there is a total of N number of content items. Common cache spaces 654 each store C number of content items such that the number of content items stored in each common cache space 654 is the same in each node. It is understood that the number of content items stored in different common cache spaces 654 may be different in other embodiments. Specific cache spaces 656 each store S number of content items such that each specific cache space 656 stores the same number of content items as each other. It is understood that the number of content items stored in different specific cache spaces 654 may be different in other embodiments. Network connections 640a to 640m are also labeled to distinguish between individual network connections 640.

The content-based centrality of network nodes 630 in FIG. 6 may be calculated using the Equation 1 for content-based centrality show above and the process shown in FIG. 5. For example, using the approach found in FIG. 5, the calculation for the content-based centrality for node $v_3$ 630c can be broken down as follows:

| | | cbc($v_3$) | | | |
|---|---|---|---|---|---|
| user, u | content, x | shortest paths | $\sigma_{ux}$ | $\sigma_{ux}(v_1)$ | ratio | sum of ratios |
| user A | 460 | $v_6, v_3, v_1$ | 2 | 2 | 1 | C |
|  |  | $v_6, v_3, v_4$ |  |  |  |  |
|  | 462 | $v_6, v_3, v_1$ | 1 | 1 | 1 | S |
|  | 464 | $v_6, v_3, v_4$ | 1 | 1 | 1 | S |
|  | 466 | $v_6, v_3, v_2$, server | 2 | 2 | 1 | S |
|  |  | $v_6, v_3, v_2, v_5$ |  |  |  |  |
|  | 468 | $v_6, v_3, v_2$, server | 1 | 1 | 1 | S |
| (subtotal) |  |  |  |  |  | N |
| user B | 460 | $v_7, v_4$ | 1 | 0 | 0 | 0 |
|  | 462 | $v_7, v_4, v_2$, server | 2 | 1 | 1/2 | S/2 |
|  |  | $v_7, v_4, v_3, v_1$ |  |  |  |  |
|  | 464 | $v_7, v_4$ | 1 | 0 | 0 | 0 |

| | | cbc($v_3$) | | | |
|---|---|---|---|---|---|
| user, u | content, x | shortest paths | $\sigma_{ux}$ | $\sigma_{ux}(v_1)$ | ratio | sum of ratios |
|  | 466 | $v_7, v_4, v_2$, server | 3 | 0 | 0 | 0 |
|  |  | $v_7, v_4, v_2, v_5$ |  |  |  |  |
|  |  | $v_7, v_4, v_8, v_5$ |  |  |  |  |
|  | 468 | $v_7, v_4, v_2$, server | 1 | 0 | 0 | 0 |
| (subtotal) |  |  |  |  |  | S/2 |
| user C | 460 | $v_8, v_4$ | 2 | 0 | 0 | 0 |
|  |  | $v_8, v_5$ |  |  |  |  |
|  | 462 | $v_8, v_5, v_2$, server | 3 | 1 | 1/3 | S/3 |
|  |  | $v_8, v_4, v_2$, server |  |  |  |  |
|  |  | $v_8, v_4, v_3, v_1$ |  |  |  |  |
|  | 464 | $v_8, v_4$ | 1 | 0 | 0 | 0 |
|  | 466 | $v_8, v_5$ | 1 | 0 | 0 | 0 |
|  | 468 | $v_8, v_5, v_2$, server | 2 | 0 | 0 | 0 |
|  |  | $v_8, v_4, v_2$, server |  |  |  | 0 |
| (subtotal) |  |  |  |  |  | S/3 |
| total |  |  |  |  |  | N + 5S/6 |

As can be seen for example with respect to FIG. 6 and the subtotal under user A, there are two shortest paths between the user A and the common content item 460. Common content item 460 is stored in node $v_1$, which is three nodes away from user A (via nodes $v_6$, $v_3$ and $v_1$). Common content item 460 is also stored in node $v_4$, which is three nodes away from user A (via nodes $v_6$, $v_3$ and $v_4$). Common content item 460 is also stored in the server 110 and node $v_5$. However, the number of nodes between user A and the server 110 or node $v_5$ is greater than three nodes and thus are not used in determining content-based centrality. As noted, only the shortest path between a user and a content item is used in determining content-based centrality.

In the above example, there were two shortest paths to common content item 460 through node $v_3$, and there were two shortest paths to common content item 460 (i.e., all shortest paths to common content item 460 go through node $v_3$). Thus, the ratio is 2/2=1. As noted, when describing the shortest path between a common content item and a user, the ratio of the number of shortest paths to the common content item through a particular node to the number of shortest paths to the common content item can be expressed in terms of the number of common content items in each cache 652. In this example, C=1, i.e., there is a single common content item (460). Thus, the ratio of 2/2=1 can be expressed as C. In other examples where the ratio is other than 1, the ratio can be expressed as a fraction of C.

In the above example, there is a single shortest path between the user A and the specific content item 462 stored in node $v_1$, which is three nodes away from user A (via nodes $v_6$, $v_3$ and $v_1$). In this example, there is a single shortest path to specific content item 462 through node $v_3$, and there is a single shortest path to specific content item 462 (i.e., the shortest path to specific content item 462 goes through node $v_3$). Thus, the ratio is 1/1=1. As noted, when describing the shortest path between a specific content item and a user, the ratio of the number of shortest paths to the specific content item through a particular node to the number of shortest paths to the specific content item can be expressed in terms of the number of specific content items in each cache 652. In this example, S=1, i.e., there is a single specific content item in the respective caches 652. Thus, the ratio of 1/1=1 can be expressed as S. In other examples where the ratio is other than 1, the ratio can be expressed as a fraction of S.

Given that all shortest paths from user A to any content item (common or specific) must pass through node $v_3$, the sum of ratios associated with the shortest paths originating from user A to all content items is C+4S as shown in the subtotal for user A. In other words, the sum of ratios associated with the shortest paths originating from user A to all content items is assigned an equal value to the total number of content items in the network. In this embodiment, there is a single common content item C, and four specific content items S. This is the total number of content items, which can also be expressed as N. Thus, the sum of ratios associated with the shortest paths originating from user A to all content items can also be expressed as N, as shown in the subtotal for user A.

Using the same methodology, the subtotals for the users B and C can also be determined as shown in the above table. The resultant content-based centrality for node $v_3$ is thus:

$cbc(v_3)$=the sum of the subtotals for users A, B and C $cbc(v_3)$=N+S/2+S/3

$cbc(v_3)$=N+5S/6.

Similarly, by way of another example, the content-based centrality of node $v_5$ may be calculated as follows:

| | | | | | | |
|---|---|---|---|---|---|---|
| | | | $cbc(v_5)$ | | | |
| user, u | content, x | shortest paths | $\sigma_{ux}$ | $\sigma_{ux}(v_5)$ | ratio | sum of ratios |
| user A | 460 | $v_6, v_3, v_1$ | 2 | 0 | 0 | 0 |
| | | $v_6, v_3, v_4$ | | | | |
| | 462 | $v_6, v_3, v_1$ | 1 | 0 | 0 | 0 |
| | 464 | $v_6, v_3, v_4$ | 1 | 0 | 0 | 0 |
| | 466 | $v_6, v_3, v_2$, server | 2 | 1 | 1/2 | S/2 |
| | | $v_6, v_3, v_2, v_5$ | | | | |
| | 468 | $v_6, v_3, v_2$, server | 1 | 0 | 0 | 0 |
| (subtotal) | | | | | | S/2 |
| user B | 460 | $v_7, v_4$ | 1 | 0 | 0 | 0 |
| | 462 | $v_7, v_4, v_2$, server | 2 | 0 | 0 | 0 |
| | | $v_7, v_4, v_3, v_1$ | | | | |
| | 464 | $v_7, v_4$ | 1 | 0 | 0 | 0 |
| | 466 | $v_7, v_4, v_2$, server | 3 | 2 | 2/3 | 2S/3 |
| | | $v_7, v_4, v_2, v_5$ | | | | |
| | | $v_7, v_4, v_8, v_5$ | | | | |
| | 468 | $v_7, v_4, v_2$, server | 1 | 0 | 0 | 0 |
| (subtotal) | | | | | | 2S/3 |
| user C | 460 | $v_8, v_4$ | 2 | 1 | 1/2 | C/2 |
| | | $v_8, v_5$ | | | | |
| | 462 | $v_8, v_5, v_2$, server | 3 | 1 | 1/3 | S/3 |
| | | $v_8, v_4, v_2$, server | | | | |
| | | $v_8, v_4, v_3, v_1$ | | | | |
| | 464 | $v_8, v_4$ | 1 | 0 | 0 | 0 |
| | 466 | $v_8, v_5$ | 1 | 1 | 1 | S |
| | 468 | $v_8, v_5, v_2$, server | 2 | 1 | 1/2 | S/2 |
| | | $v_8, v_4, v_2$, server | | | | |
| (subtotal) | | | | | | 4S/3 + (N − 3S)/2 |
| total | | | | | | N/2 + S |

For the subtotal under user C, the sum of ratios of the number of shortest paths passing through node $v_5$ to the total number of shortest paths for all other content other than 462, 464, and 466 can be represented as (N-3S)/2. Thus, adding the sum or ratios for content blocks 462, 464, and 466, the subtotal for user C is 4S/3+(N-3S)/2. Another way to derive this is by adding the sum or ratios for every content block under user C, which yields C/2+S/3+S+S/2=4S/3+C/2+S/2. Given that N=C+4S in this embodiment, C/2+11S/6 can be simplified as follows:

$$4S/3 + C/2 + S/2 = 4S/3 + ((C + 4S) - 3S)/2 = 4S/3 + (N - 3S)/2$$

As seen from the above calculations, the content-based centrality of node $v_5$ is:

$cbc(v_5)$=the sum of the subtotals for users A, B and C $cbc(v_5)$=S/2+2S/3+4S/3+(N-3S)/2

$cbc(v_5)$=N/2+S.

Figure 7:
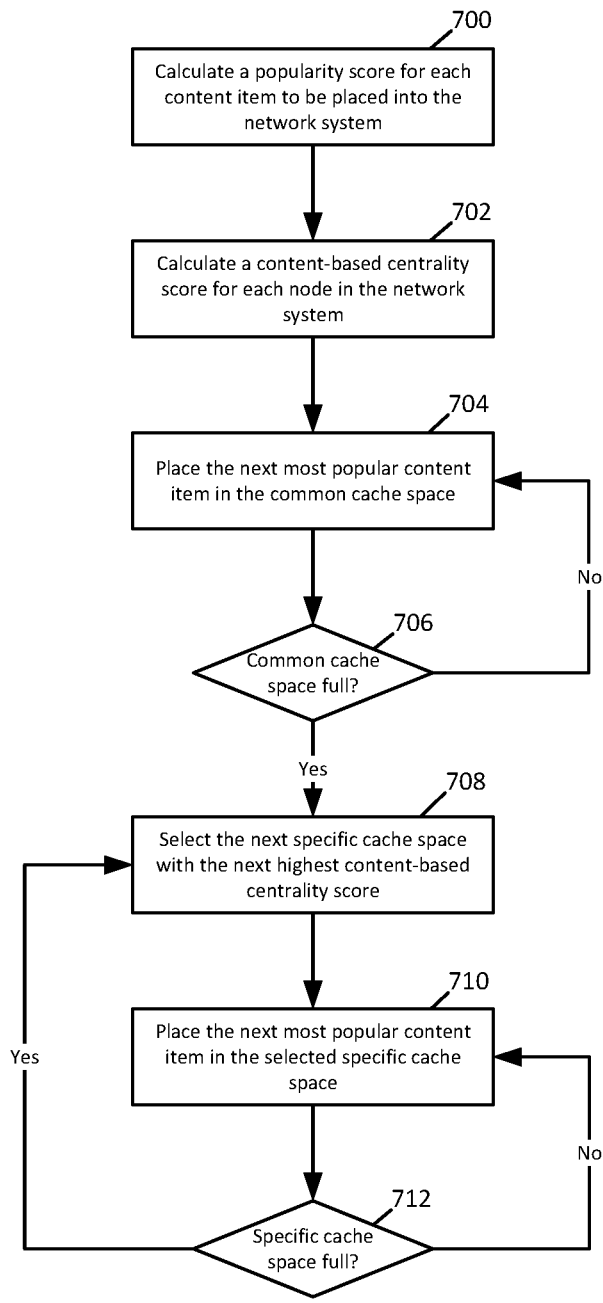
FIG. 7 is a flowchart illustrating an embodiment of the present technology wherein content is allocated in a network based on their content centrality.

The content centrality scores for each of the various nodes in the network may be used for allocating content into caches. For example, nodes with the highest content-based centrality score may be selected or identified for allocating the content items. FIG. 7 is a flow diagram describing an exemplary approach for allocating content items into caches 452 associated with network nodes 330 in a network system 100 that makes use of the centrality metric described above for prioritizing caches 452 when allocating content items. In one embodiment, a popularity score is determined at step 700 for each content item to be placed into the network system 100. In one embodiment, the popularity score for a content item is derived from historical data associated with the content item, such as data on the number of user requests for that content item, frequency of requests within a time period, or the like. For example, a content item that is frequently requested may have a higher popularity score than a content item that is less frequently requested. In another embodiment the popularity score is a fixed value associated with the content item when the content item is received. It is understood that there may be other methods of determining a popularity score for a content item.

At step 702, a content-based centrality score may be calculated for each network node 330 in the network system 100. The content-based centrality score may be calculated using the approaches previously discussed, or any other approaches for calculating content-based centrality of network nodes.

At step 704, content items may be placed into the common cache spaces 454 found within each of the one or more caches 452 associated with the one or more network nodes 330 in the network system 100. In one embodiment, the common cache spaces 454 of every cache 452 are all of the same size and can therefore store the same number of content items. In another embodiment, the common cache spaces 454 of different caches 452 may be of a different sizes and can therefore store a different number of content items. Content items are placed into the common cache space 454 in decreasing order of popularity score, so that the content items with the highest popularity score are placed first, followed by the second highest, and so on. Thus, for example, where each node has common cache spaces 454 with sufficient memory for three content items, the three content items with the highest popularity score will be placed in the common cache spaces 454 of each node.

At step 706, the common cache space is checked to determine whether it is full. In one embodiment, this is checked every time after a content item has been placed into the common cache space 454. In another embodiment, this check is performed periodically, such as once every time interval, or once every time a certain number of content items have been placed. In another embodiment, a hybrid approach may be used where the check is performed periodically when the common cache space still has a substantial amount of free space, and performed after every content placement iteration when the amount of free space is about to run out. If the check finds that the common cache space 454 is not yet full, then the process loops back to step 704 where the placement of content items into the common cache space continues. On the other hand, if the check finds that the common cache space 454 is full, then the process proceeds to step 708.

At step 708, the specific cache space 456 associated with the network node 330 having the highest content-based centrality score, as previously calculated in step 702, is selected. Although not shown in FIG. 7 for simplicity, it is understood that if all specific cache spaces 456 have previously been selected and are all full, then no specific cache space 456 is selected and the process ends. In one embodiment, a specific cache space 456 that has previously been selected is never selected again. In another embodiment, a check may be performed to determine whether previously selected specific cache spaces now have freed up space such that they may be selected again so that more content items can be stored in them.

At step 710, the remaining content items are placed into the selected specific cache space 456 in decreasing order of popularity score. At step 712, a check is performed to determine whether the selected specific cache space 456 is now full. Similar to step 706, the check in step 712 may be performed at every content placement iteration or periodically. If the selected specific cache space 456 is not yet full, then the process loops back to step 710 and the placement of content into the selected specific cache space 456 continues. Otherwise, if the selected specific cache space 456 is full, then the process loops back to step 708 so that another specific cache space having the next highest content-based centrality score may be selected.

In the example of FIG. 7, popularity of a content item is used for prioritizing placement of content items in common (step 704) and specific (step 710) cache spaces. However, in further embodiments, the concept of content item popularity may factor into the calculation of content-based centrality itself. In such an embodiment, the popularity of a given content item may be calculated by a variety of methods, but in general relates to a probability that a node will request a given content item. This may be based on historical data. The popularity of a given content item x may be defined as a probability, $p_x$, that a node will request a content item x, where $\Sigma_x p_x = 1$. In embodiments, caching nodes are aware of the probability $p_x$, either because it is periodically provided by the server or by using some empirical estimate from the interests that the different caching nodes observe.

In the embodiments above, content-based centrality was defined as the sum of the ratio of: the number of shortest paths from all users to all content that passes through the node, to the total number of shortest paths from the users to the content. In accordance with this alternative embodiment, a new centrality may be defined, referred to herein as popularity-weighted, content-based centrality. Mathematically, the popularity-weighted, content-based centrality of a node v can be represented as:

$$cbc(v) = \sum_{u \neq v \neq x} \frac{\sigma_{ux}(v)}{\sigma_{ux}} p_x$$

where $\sigma_{ux}(v)$ is the number of shortest paths from a user node u to content x that passes through the node v, $\sigma_{ux}$ is the total number of shortest paths from user node u to the content x, and $p_x$ is the popularity of content x, i.e., the probability of a request for content x.

Using this modified popularity-weighted, content-based centrality, the centrality of each node may be calculated as described above with respect to FIGS. 3-6 above. The examples of topological networks illustrated in FIGS. 3-4 and 6 are relatively simple and provided to illustrate the concepts of content-based centrality and popularity-weighted, content-based centrality. However, in practice, topological networks would potentially be larger, and the calculation of popularity-weighted, content-based centrality could become more complex.

Therefore, in a further embodiment, a scalable popularity-weighted, content-based centrality may be pre-computed for all cache combinations in a network. Such a computation has an advantage that is scales with the number of caches in a network, and not the number of content items, reducing the complexity of the computation. An embodiment for computing a scalable popularity-weighted, content-based centrality will now be explained with reference to the flowchart of FIG. 8.

In step 800, this embodiment may begin by defining a number of caching nodes $\{c_1, c_2, \ldots, c_m\}$ in the network. A piece of content can be in any one of these nodes. There are $2^{\{c1, c2, \ldots, cm\}}$ potential combinations of caches a content item can belong to. In step 802, a set of caches, cp, (cache permutations or combinations) may be denoted. There may be between 0 and m caches in the set of cache combinations cp.

For each of these combinations, the popularity-weighted, content-based centrality may be computed once for a single content item x of popularity 1, located at the caches in this combination cp, with the assumption of no other content items located anywhere else. That is, content item x is treated as the only content item in the set of caches. The popularity-weighted, content-based centrality for x and cp at node v is computed in step 806. Step 806 is repeated for all the combinations $2^{\{c1, c2, \ldots, cm\}}$. The popularity-weighted, content-based centrality values are stored in a table within each cache in step 810.

In practice, adding more copies of the same item in more caches has a decreasing marginal utility. As such, in embodiments, the popularity-weighted, content-based centrality value does not need to be computed for every combination cp, though the computation may be performed for each combination in further embodiments.

The process of steps 800-810 scales with the number of cache combinations, and may be done offline and only once. Thereafter, in order to compute the popularity-weighted, content-based centrality value of a specific content placement, the cache permutation cp(x) of content item x is retrieved from the table stored in step 810. A content item x will belong at any point of time to one cache set combination cp(x) and the popularity-weighted, content-based centrality (PWCBC) of node v can therefore be computed by:

$$PWCBC(v) = \Sigma_x p_x PWCBC_{cp(x)}(v)$$

where $p_x$ is the popularity of content item x, and $PWCBC_{cp(x)}(v)$ is the pre-computed portion of the centrality measure (referred to herein as the "pre-computed centrality measure"). This may be used to compute the popularity-weighted, content-based centrality value across all nodes and content items.

Figure 8:
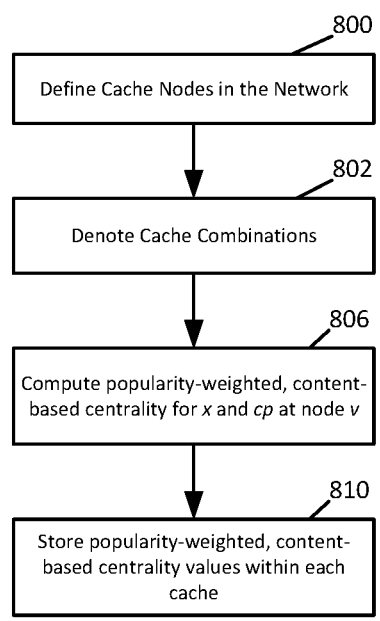
FIG. 8 is a flowchart illustrating an alternative embodiment of the present technology for computing scalable popularity-weighted, content-based centrality values.
Figure 9:
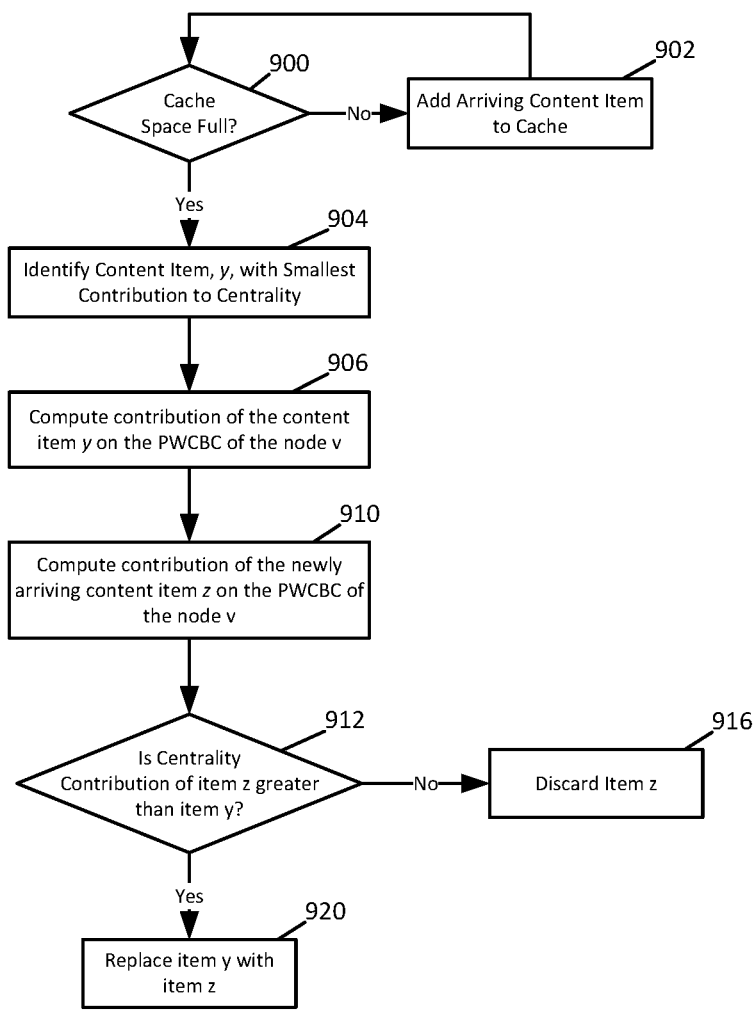
FIG. 9 is a flowchart illustrating an embodiment of the present technology for implementing a cache replacement policy algorithm using popularity-weighted, content-based centrality values.

The popularity-weighted, content-based centrality and the efficient method of its calculation as shown in FIG. 8 may be used to implement a cache replacement policy algorithm in the network topology. Such a cache replacement policy algorithm will now be described with respect to FIG. 9. The network is initially empty of any content items. In step 900, when a content item arrives at the cache and the cache is not full, the content item is added to that cache in step 902.

If, on the other hand, the cache is full, the cache replacement algorithm may evaluate how the incoming content item will affect centrality of the node (e.g., popularity-weighted, content-based centrality), as compared to the content item having the smallest, current contribution to the centrality of the node. If the incoming content item has a greater effect on the centrality of the node, it replaces the smallest, current contributor. If it has lesser effect on centrality, the items in the cache remain as is and the incoming item is discarded. These operations are explained below in steps 904-920.

For a content item z arriving at a node v having a (full) cache, the algorithm initially identifies the content item, y, having the least effect on the popularity-weighted, content-based centrality of the node v in step 904. In particular, each content item belongs to a set of combinations of caches. The contribution of one generic item (e.g., popularity=1) that belongs to a specific combination of caches to the centrality may be computed as explained above. This generic contribution may then be multiplied by the specific popularities of items in the cache to identify the item having the least effect on centrality. To do this efficiently, a list of items can be stored at each cache, ordered from greatest contributor to the smallest contributor. Upon receipt of a new item, the item y may be taken from the bottom of the list. The stored list may be updated periodically based upon changes in the other caches, etc.

Once the item y is identified, the contribution of the content item y on the popularity-weighted, content-based centrality of the node v may be computed in step 906. As indicated above, this may be computed using the pre-computed centrality measure, together with the popularity of content item y and cache set combinations, cp(y), that include y:

$$PWCBC_y(v) = \Sigma_y p_y PWCBC_{cp(y)}(V)$$

where $p_y$ is the popularity of content item y, and $PWCBC_{cp(y)}(v)$ is the pre-computed centrality measure using the cache set combination cp(y). The contribution of content item y to the popularity-weighted, content-based centrality of the node v may be low, due to content item y not being used often. Alternatively, it could be low because it is being used often but it exists on several other caches. Thus, the centrality measure is reduced because the number of shortest paths not going through the cache will be higher. The popularity value $p_y$ may be either periodically provided by the server, or estimated by empirically monitoring the rate of interests for content item y. The value cp(y) may be provided by the algorithm to update the stored routing tables.

In step 910, the contribution of the newly arrived content item z on the popularity-weighted, content-based centrality of the node v may be computed. Again, this may be computed using the pre-computed centrality measure, together with the popularity of content item z and cache set combinations, cp(z), that include z:

$$PWCBC_z(v) = \Sigma_z p_z PWCBC_{cp(z)}(v)$$

where $p_z$ is the popularity of content item z, and $PWCBC_{cp(z)}(v)$ is the pre-computed centrality measure using the cache set combination cp(z). The popularity value $p_z$ may be either periodically provided by the server, or estimated by empirically monitoring the rate of interests for content item z. The value cp(y) may be provided by the algorithm to update the stored routing tables.

In step 912, $PWCBC_y(v)$ is compared against $PWCBC_z(v)$ to determine which content item has a greater effect on the centrality of node v. If content item y has a greater effect on centrality, then the newly arrived content item z is discarded (step 916). On the other hand, if content item z has a greater effect on centrality, then content item z is added to the cache and content item y is discarded (step 920). The replacement policy algorithm is operable to increase the popularity-weighted, content-based centrality at each cache for each content inclusion/eviction decision.

Figure 10:
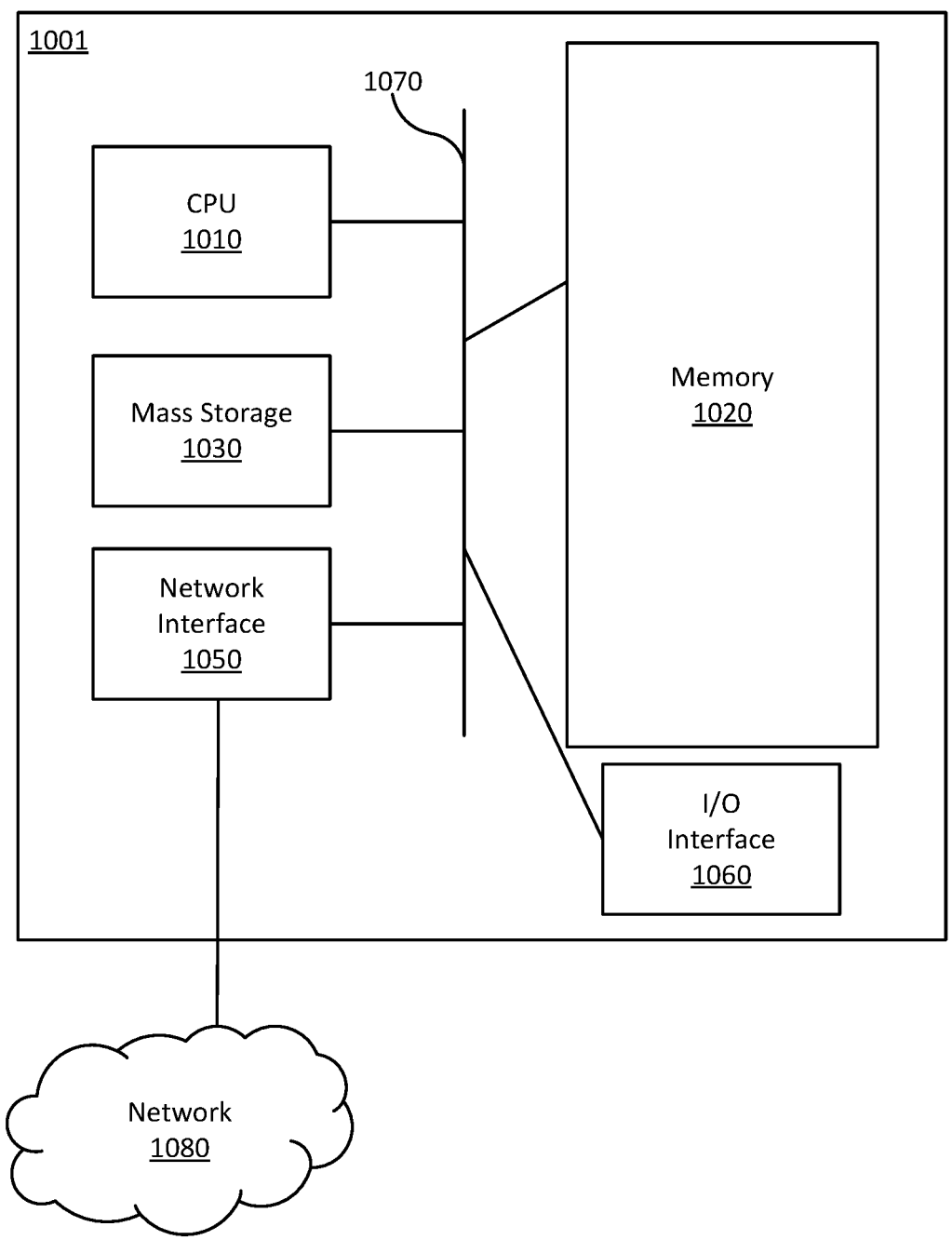
FIG. 10 is a block diagram of a computing environment which may be used to implement aspects of the present technology.

FIG. 10 is a block diagram of a network device that can be used to implement various embodiments. Specific network devices may utilize all of the components shown, or only a subset of the components, and levels of integration may vary from device to device. Furthermore, the network device 1000 may contain multiple instances of a component, such as multiple processing units, processors, memories, transmitters, receivers, etc. The network device 1000 may comprise a processing unit 1001 equipped with one or more input/output devices, such as network interfaces, storage interfaces, and the like. The processing unit 1001 may include a central processing unit (CPU) 1010, a memory 1020, a mass storage device 1030, and an I/O interface 1060 connected to a bus 1070. The bus 1070 may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. In one embodiment, the memory 1020 includes instructions for executing the processes described in various embodiments of the present technology.

The mass storage device 1030 may comprise any type of storage device configured to store data, programs, and other information and to make the data, programs, and other information accessible via the bus 1070. The mass storage device 1030 may comprise, for example, one or more of a solid state drive, hard disk drive, a magnetic disk drive, an optical disk drive, or the like.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

According to the embodiments, the disclosed technology provides the following advantages, including, but not limited to, a cost based code generation method that achieves the best solution for JIT compiled execution, where the most cost effective method of code generation for a specific query and data size is selected. Grouping code generation may be implemented in order to reduce compilation cost (i.e., one method of code generation for the cost model). Moreover, the cost model can choose the best solution between JIT compiled execution or no code generation.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network content allocation device for allocating content items in a network comprising a plurality of nodes and one or more user devices, the network content allocation device comprising:
   a non-transitory memory storage comprising instructions; and
   one or more processors in communication with the memory, wherein the one or more processors execute the instructions to:
   determine a popularity-weighted, content-based centrality score for each of the plurality of nodes, the content based centrality score for a node determined by computing a weighted popularity of content items in the node,
a centrality of the node based on a location of the node relative to locations of the one or more user devices and relative to the content items in the network, and
a sum of a ratio of a number of shortest paths from the one or more users to content items that pass through the node and to a total number of shortest paths from the one or more users to the content items; and
allocate content items to the plurality of nodes based on a comparison of popularity-weighted, content-based centrality scores among nodes in the network,
wherein a first content item arriving at the node replaces a second content item stored in cache at the node where the node including the first content item and not the second content item is determined to have a higher popularity-weighted, content-based centrality score than the node including the second content item and not the first content item.

2. The network content allocation device of claim 1, wherein determining the popularity-weighted content-based centrality score for each cache in the network is based on the network topology of the network system as well as the allocation of content items among caches in the network system.

3. The network content allocation device of claim 1, wherein the one or more processors further execute instructions to determine a popularity score for each of the plurality of content items.

4. The network content allocation device of claim 3, wherein determining a popularity score for each content item is based on a predetermined value associated with each content item.

5. The network content allocation device of claim 3, wherein determining the popularity score for each content item is based on a number of user requests for each content item according to historical data.

6. The network content allocation device of claim 3, wherein determining a popularity score for each content item comprises requesting the popularity scores associated with each content item from a content operator.

7. The network content allocation device of claim 1, wherein content items are stored in memory of the plurality of nodes based on a popularity score of the plurality of nodes and the content-based centrality of the nodes.

8. The network content allocation device of claim 7, wherein the memory of the plurality of nodes comprises a common cache space storing content items that are stored in each of the plurality of nodes, and a specific cache space storing content items that are stored in less than each of the plurality of nodes.

9. The network content allocation device of claim 8, wherein the one or more processors further execute instructions to:
store a copy of each of the content items, in decreasing order of popularity score, in the common cache space of each node in the network until the common cache space of node in the network becomes full or until all content items have been placed;
select the specific cache space of the node having the highest content-based centrality score in response to the common cache of each node being full;
store each of the remaining content items, in decreasing order of popularity score, in the selected specific cache space until the selected specific cache space becomes full or until all content items have been placed; and
select the specific cache space of the cache having the next highest content-based centrality score in response to the selected specific cache space being full.

10. The network content allocation device of claim 8, wherein the common cache space of each of the plurality of nodes has the same size and contain copies of the same content items.

11. A computer-implemented method for allocating one or more content items among one or more caches in a network, comprising:
determining a popularity-weighted, content-based centrality score for each of the plurality of nodes, the content based centrality score for a node determined by computing
a weighted popularity of content items in the node,
a centrality of the node based on a location of the node relative to locations of the one or more user devices and relative to the content items in the network, and
a sum of a ratio of a number of shortest paths from the one or more users to content items that pass through the node and to a total number of shortest paths from the one or more users to the content items; and
allocating content items to the plurality of nodes based on a comparison of popularity-weighted, content-based centrality scores among nodes in the network,
wherein a first content item arriving at the node replaces a second content item stored in cache at the node where the node including the first content item and not the second content item is determined to have a higher popularity-weighted, content-based centrality score than the node including the second content item and not the first content item.

12. The computer-implemented method of claim 11, further comprising the step of determining a popularity score for each of the plurality of content items.

13. The computer-implemented method of claim 11, further comprising the step of storing the content items in memory of the plurality of nodes based on a popularity score of the plurality of nodes and the content-based centrality of the nodes.

14. The computer-implemented method of claim 11, wherein the memory of the plurality of nodes comprises a common cache space storing content items that are stored in each of the plurality of nodes, and a specific cache space storing content items that are stored in less than each of the plurality of nodes.

15. A network content allocation device for allocating content items in a network comprising a plurality of nodes and one or more user devices, the network content allocation device comprising:
a non-transitory memory storage comprising instructions; and
one or more processors in communication with the memory, wherein the one or more processors execute the instructions to:
determine a popularity-weighted, content-based centrality score for each of the plurality of nodes, the content based centrality score for a node determined by computing
a weighted popularity of content items in the node,
a centrality of the node based on a location of the node relative to locations of the one or more user devices and relative to the content items in the network, and
a sum of a ratio of a number of shortest paths from the one or more user devices to the content items that pass through the node to a total number of shortest paths from the one or more user devices to the content items; and allocate content items to the plurality of nodes based on a comparison of popularity-weighted, content-based centrality scores among nodes in the network, wherein a first content item arriving at the node replaces a second content item stored in cache at the node where the node including the first content item and not the second content item is determined to have a higher popularity-weighted, content-based centrality score than the node including the second content item and not the first content item.

16. The network content allocation device of claim 15, wherein portions of the popularity-weighted, content-based centrality score for the node are pre-computed and stored in cache at the node.

17. A network content allocation device for allocating content items in a network comprising a plurality of nodes and one or more user devices, the plurality of nodes comprising a plurality of caches, the network content allocation device comprising:

a non-transitory memory storage comprising instructions; and one or more processors in communication with the memory, wherein the one or more processors execute the instructions to:

determine a popularity-weighted, content-based centrality score for each of the plurality of nodes, the popularity-weighted, content based centrality score for a node determined using a pre-computed centrality measure, the pre-computed centrality measure computed by:

determining a number of different combinations of the plurality of caches, determining, for the plurality of different combinations of caches, the pre-computed centrality measure for a single content item based on a location of the plurality of caches relative to locations of the one or more user devices relative to the single content item and using a predefined popularity value for the single content item, and storing the pre-computed centrality measure for the single content item in the plurality of caches.

18. The network content allocation device of claim 17, further comprising the step of determining the popularity-weighted, content-based centrality value of a specific content item at a cache of the plurality of caches by retrieving the pre-computed centrality measure for the single content item and multiplying the pre-computed centrality measure by a popularity value of the specific content item.

* * * * *